Figure 1:
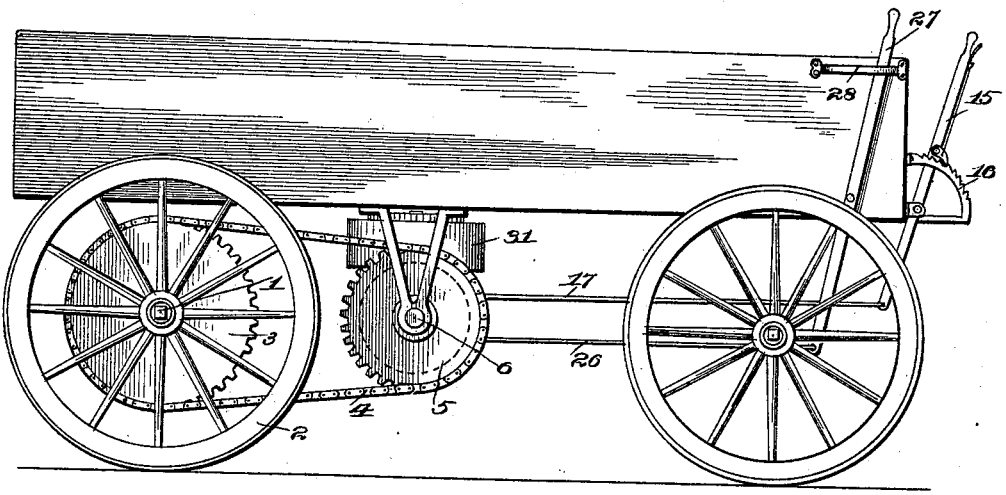

No. 613,966.  
S. CARLSEN.  
WAGON ATTACHMENT.  
(Application filed Jan. 25, 1897.)  
Patented Nov. 8, 1898.

(No Model.)

2 Sheets—Sheet 1.

WITNESSES

INVENTOR  
Soren Carlsen,  
By
Attorney

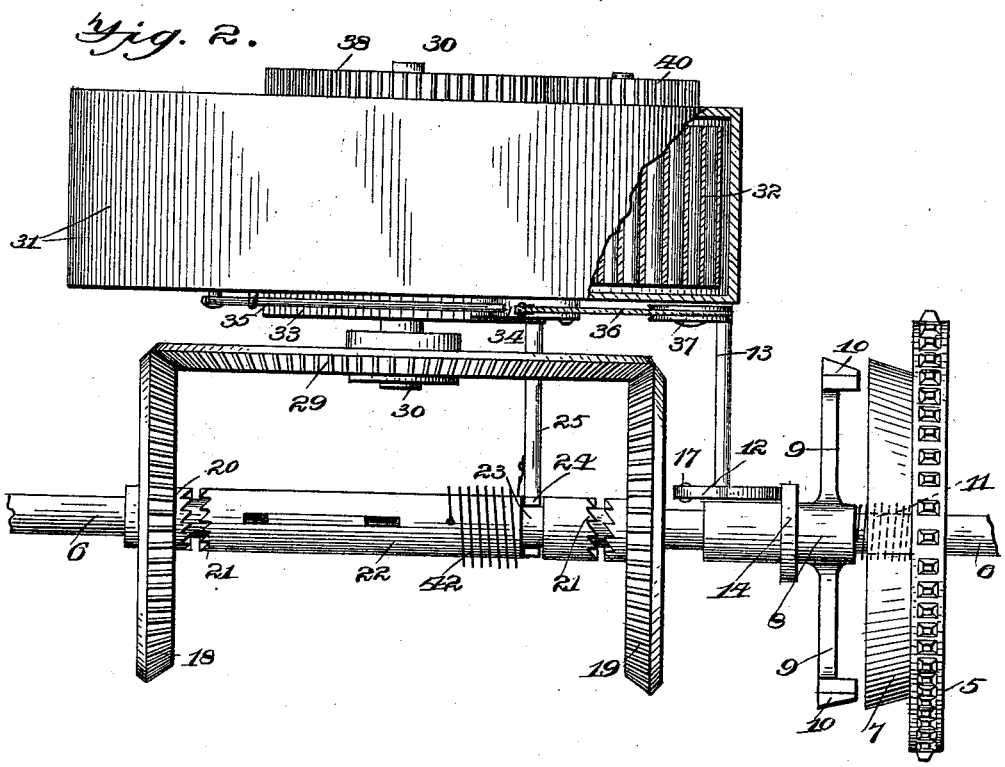

UNITED STATES PATENT OFFICE.

SOREN CARLSEN, OF HARLAN, IOWA.

WAGON ATTACHMENT.

SPECIFICATION forming part of Letters Patent No. 613,966, dated November 8, 1898.

Application filed January 25, 1897. Serial No. 620,543. (No model.)

*To all whom it may concern:*

Be it known that I, SOREN CARLSEN, a citizen of the United States, residing at Harlan, in the county of Shelby and State of Iowa, have invented certain new and useful Improvements in Wagon Attachments; and I do hereby declare the following to be a full, clear, and exact description of the invention, such as will enable others skilled in the art to which it appertains to make and use the same.

This invention relates to wagons and other wheeled vehicles, and has for its object to provide means adapted to be attached to a vehicle whereby the energy lost in descending grades may be taken advantage of and stored or accumulated, so that such energy may at any subsequent time be utilized for assisting in the propulsion of the vehicle on an upgrade, thus materially relieving the draft-animals.

The detailed objects and advantages of the invention will appear in the course of the subjoined description.

The invention consists in certain novel features and details of construction and arrangement of parts, as hereinafter described, illustrated in the drawings, and pointed out in the claims hereto appended.

Figure 3:
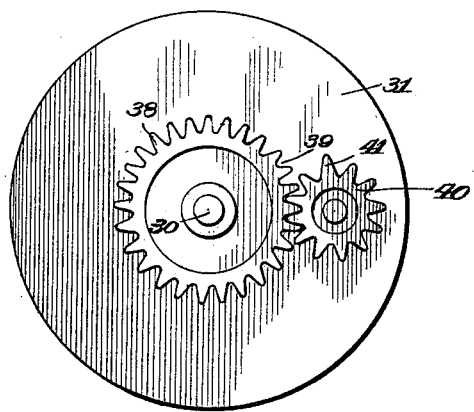

In the accompanying drawings, Figure 1 is a side elevation of a sufficient portion of a wagon to illustrate the application of the present improvements thereto. Fig. 2 is a view in elevation of the gearing, clutches, &c., whereby the energy is stored for future use, said view also showing the accumulating-springs. Fig. 3 is a bottom plan view of the accumulator-case, showing the means for limiting the winding of the springs. Fig. 4 is a top plan view of the case, showing the pawl-and-ratchet connection between the accumulator-shaft and the casing.

Similar numerals of reference designate corresponding parts in the several figures of the drawings.

Referring to the drawings, 1 designates one of the axles of a wagon or other vehicle, and 2 one of the carrying-wheels thereof. Mounted fast upon the axle 1 is a sprocket-wheel 3, from which a drive-chain 4 passes around a second sprocket-wheel 5, mounted revolubly, but otherwise immovably, upon a countershaft 6, extending transversely beneath the bottom of the vehicle and parallel with the axle 1. The sprocket-wheel 5 is provided upon one side with a bell-shaped or flaring annular flange 7, and mounted on the axle 6, upon the same side of the sprocket-wheel 5 as the flange 7, is a clutch 8, having a feather-and-spline connection with the shaft 6 and provided with oppositely - projecting radial arms 9, at the outer extremities of which are shoes 10, preferably faced with rubber, leather, or analogous material, the said shoes being adapted, when the clutch 8 is slid toward the sprocket-wheel 5, to engage within the flange 7 and to take frictional hold thereon, thus causing said sprocket-wheel 5 to be positively engaged with the axle 6, so as to turn therewith. Interposed between the clutch 8 and the sprocket-wheel 5 is a coil-spring 11, surrounding the said axle and serving by its expansive force to push the clutch 8 away from the sprocket-wheel 5 and out of engagement with the flange 7. The clutch 8 is moved into engagement with the flange 7 by means of a cam-lever 12, fulcrumed at 13, intermediate its ends, and bearing against a collar 14 on the hub or sleeve of the clutch 8, whereby as said cam-lever is vibrated in one direction it will slide said clutch upon the shaft 6 and into engagement with the sprocket-wheel 5. The cam-lever 12 is operated by means of a latch-lever 15, mounted on the wagon at any convenient point and engaging a segmental rack 16, whereby it may be held fast, the said lever 15 having a rod or other connection 17 extending from it to the cam-lever 12.

Mounted loosely upon the shaft 6 at spaced points are beveled gear-wheels 18 and 19, the said wheels being provided upon their inner sides with clutches 20, adapted to be alternately engaged by the clutch-faced ends 21 of a sleeve 22, having a feather-and-spline connection with the shaft 6. This sleeve is provided at a suitable point with an annular groove 23, in which fits a shipping-fork 24, pivotally connected to one arm of an elbow-lever 25, the other arm of which receives a rod or other suitable connection 26, which extends to a latch-lever 27, mounted at any convenient point on the vehicle and adapted to engage with a segmental rack 28 for holding the same fast. By means of the lever 27 and its connections the sleeve 22 may be slid in either direction on the shaft 6 for engaging one or the other of the wheels 18 and 19 with the shaft 6, so as to rotate therewith, the arrangement being such that when one of said wheels is clutched to the shaft the other wheel is idle.

Arranged above the wheels 18 and 19 and meshing constantly therewith is a crown-gear 29, the shaft 30 of which extends upward into and through a cylindrical casing 31, in which is arranged a coiled spring 32 or a series of such springs, whereby the energy may be accumulated. This spring is attached at one end to the shaft 30 and at its opposite end to the inside of the casing 31, so that as the crown-gear 29 is rotated said spring is wound or unwound, as the case may be. At one side of the casing 31, preferably on the bottom side and secured fast to the shaft 30, is a ratchet-disk 33, which is engaged by a pawl 34, pivoted to the casing and held in yielding engagement with the ratchet-disk 33 by means of an arc-spring 35, secured at one end to the casing and bearing at its free end against said pawl. From the pawl a cord or other connection 36 extends around a grooved pulley 37 and to a point within reach of the operator, who by drawing on said connection may rock the pawl 34 out of engagement with the ratchet-disk for applying the accumulated energy in the springs to the mechanism described, and thereby driving the axle 1 of the vehicle. At the same time the pawl 34 and the ratchet-disk 33 prevent the unwinding of the spring when the energy is being stored therein. Upon the opposite or upper side of the casing 31 and connected fast to the shaft 30 is a toothed wheel 38, provided at one point between two of its teeth with a space or recess 39, which is shallower than the remaining spaces between the teeth. Journaled upon the casing at one side of the said wheel 38 is a pinion 40, one of the teeth 41 of which is longer than the remaining teeth, so that when it comes into mesh with the shallow space 39 in the wheel 38 it will cause a stoppage of both wheels, and thereby prevent the further winding up of the springs, which by previous calculation have reached their storing capacity. The teeth of the wheel 38 mesh loosely and are so arranged as not to constitute a multiple of the number of teeth of the pinion 40, so that the wheel 38 may revolve several times before the long tooth 41 will engage in the shallow space 39.

42 designates a spring which is coiled around the sleeve 22 and has one of its terminals in engagement therewith, while its other terminal is engaged with the body of the vehicle or attached to some fixed point. The tension of this spring is exerted to maintain the sleeve 22 out of engagement with both of the wheels 18 and 19, as shown in Fig. 2, while at the same time readily yielding to permit the sleeve 22 to be slid longitudinally on the shaft 6 for the purpose described.

In operation, upon descending a slope, by means of the lever 15 the clutch 8 is thrown into engagement with the sprocket 5, thereby causing said sprocket to rotate the shaft 6. The operator now vibrates the lever 27, and thereby throws one of the wheels 18 or 19 into engagement with the crown-gear 29, thereby winding up the spring or springs within the casing 31. The energy thus accumulated may be used at any subsequent time by vibrating the lever 27, so as to clutch the opposite wheel 18 or 19 to the shaft 6 and at the same time moving the pawl 34 out of engagement with the ratchet-disk 33. The energy of the springs is now put upon the shaft 30 of the crown-gear 29 and transmitted thereby to the shaft 6, and thence through the drive-chain 4 to the axle 1 of the vehicle, thus propelling the vehicle in the same direction it was traveling in when the energy was stored.

The device above described will be found of great assistance in ascending steep grades and will relieve the draft-animals to a material extent. The mechanism is simple in construction, not liable to get out of order, and can be manufactured at a small cost.

Instead of the energy-storing springs above described suitable air-compressing mechanism may be employed and used in connection with the remainder of the gearing referred to.

The mechanism described may be used upon one or both of the rear wheels, as desired.

Having thus described the invention, what is claimed as new is—

1. The combination with a vehicle-axle, of a counter-shaft extending parallel thereto, means for transmitting motion from said axle to the counter-shaft and vice versa, spaced beveled gear-wheels mounted loosely on the counter-shaft, a crown-gear meshing constantly with both of said wheels, one or more accumulating-springs connected to said crown-gear, a sleeve slidingly mounted on said counter-shaft between the gear-wheels and having clutch-faces at its ends for engaging corresponding faces on the inner sides of both gear-wheels, an elbow-lever carrying a shipping-fork engaging said sleeve, means for vibrating said elbow-lever, and a spring for sustaining said sleeve out of normal engagement with both of said beveled gear-wheels and resisting its movement in both directions, substantially as described.

2. The combination with one or more accumulating-springs and the casing in which the same are mounted, of a shaft extending through said casing and connected to said springs, a toothed wheel mounted on said shaft and having one of the spaces between two of its teeth made shallower than the remaining spaces, and a pinion meshing with said teeth and having one of its teeth longer than the remaining teeth, all arranged for joint operation, substantially as described.

3. The combination with one or more accumulating-springs and a casing in which the same are mounted, of a shaft extending through said casing and connected to said springs, and intermeshing gears for limiting the winding of the springs, one of said gears being fast on said shaft, substantially as described.

In testimony whereof I have signed this specification in the presence of two subscribing witnesses.

SOREN CARLSEN.

Witnesses:
L. M. KERR,
N. S. WESTROPE.